United States Patent
Sabeti

(10) Patent No.: US 9,709,110 B2
(45) Date of Patent: Jul. 18, 2017

(54) BRAKE DISC VENTILATION ARRANGEMENT

(71) Applicant: Bendix Spicer Foundation Brake LLC, Elyria, OH (US)

(72) Inventor: Manouchehr Sabeti, North Olmstead, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 0 days.

(21) Appl. No.: 14/792,813

(22) Filed: Jul. 7, 2015

(65) Prior Publication Data

US 2017/0009828 A1    Jan. 12, 2017

(51) Int. Cl.
*F16D 65/12*    (2006.01)

(52) U.S. Cl.
CPC .................................. *F16D 65/128* (2013.01)

(58) Field of Classification Search
CPC ........ F16D 65/12; F16D 65/128; F16D 65/78; F16D 65/84; F16D 65/847; F16D 2065/1328; F16D 2065/788
USPC .................................................... 188/218 XL
See application file for complete search history.

(56) References Cited

U.S. PATENT DOCUMENTS

| | | | | |
|---|---|---|---|---|
| 4,928,798 A | * | 5/1990 | Watson | F16D 65/128 188/218 XL |
| 5,526,905 A | * | 6/1996 | Shimazu | F16D 65/128 188/218 XL |
| 6,626,273 B1 | * | 9/2003 | Baumgartner | F16D 65/123 188/218 XL |
| 7,410,036 B2 | | 8/2008 | Wimmer et al. | |
| 8,668,058 B2 | * | 3/2014 | Lu | F16D 65/12 188/218 XL |
| 8,733,517 B2 | * | 5/2014 | Tironi | F16D 65/128 188/218 XL |
| 2004/0163902 A1 | * | 8/2004 | Meroni | F16D 65/0006 188/218 XL |
| 2004/0178029 A1 | * | 9/2004 | Hoyte | F16D 65/12 188/218 XL |
| 2005/0217948 A1 | * | 10/2005 | Kerslake | B22C 9/10 188/71.1 |
| 2008/0302615 A1 | * | 12/2008 | Gey | F16D 65/128 188/218 XL |

(Continued)

FOREIGN PATENT DOCUMENTS

GB            2171159        *   8/1986

OTHER PUBLICATIONS

Co-pending U.S. Appl. No. 14/640,152, filed Mar. 6, 2015.

*Primary Examiner* — Vishal Sahni
(74) *Attorney, Agent, or Firm* — Crowell & Moring LLP

(57) ABSTRACT

An internally ventilated brake disc cooling air flow enhancement arrangement is provided. Between a radially inner region of a brake disc that includes brake disc-to-axle hub mounting elements and cooling vanes between the parallel friction rings of the brake disc there are provided cooling air flow-modifying features. The flow-modifying features are circumferentially arranged around the radially inner region and are sized, shaped and positioned in a manner that deflects cooling air entering the internally ventilated brake disc in the radially inner region toward the entrances of cooling channels between the vanes to increase cooling air mass flow and thereby increase heat transfer an removal from the brake disc.

4 Claims, 3 Drawing Sheets

(56) References Cited

U.S. PATENT DOCUMENTS

| | | | |
|---|---|---|---|
| 2009/0314591 A1* | 12/2009 | Suppiah | F16D 65/128 188/218 XL |
| 2010/0084231 A1* | 4/2010 | Biondo | F16D 65/12 188/218 XL |
| 2013/0175125 A1* | 7/2013 | Forster | F16D 65/123 188/218 XL |

* cited by examiner

BRAKE DISC VENTILATION ARRANGEMENT

BACKGROUND AND SUMMARY OF THE INVENTION

The present invention relates to disc brakes for vehicles, and in particular to an arrangement for enhanced cooling of a brake disc.

Disc brakes are increasing being used on commercial vehicles, replacing conventional drum brakes. Very high braking energy is generated when the disc brake's caliper applies the brake pads to the brake disc to slow such heavy vehicles. In order to deal with such loads, very robust and often complicated designs have been required to connect the brake disc of a disc brake to transfer the braking forces from the brake disc to the axle hub on which the brake disc is mounted. The design of the brake disc-to-hub connection is further complicated by the need to ensure adequate flow of cooling air from the hub region into the interior ventilation channels of an internally ventilated brake disc.

Commercial vehicle brake discs, also referred to as "brake rotors" or "rotors," often are mounted onto axle hubs using so-called spline arrangements using a fixed or floating connection, such as taught in U.S. Pat. Nos. 6,626,273 and 7,410,036. One example a semi-floating connection is the Splined Disc® brake assembly from Bendix Spicer Foundation Brake LLC. These types of brakes typically are mounted on an axle hub having a plurality of axially-oriented splines arranged around an outer circumference of a disc-mounting region of the hub. The brake disc has corresponding radially-inward facing tabs about the inner circumference of the brake disc. The disc is mounted to the axle hub by axially sliding the brake disc onto the hub's mating splines, followed by insertion and/or attachment of a variety of fasteners, brackets, etc., as necessary per the particular splined disc's design in order to secure the brake disc against axial movement off of the hub.

An alternative brake disc-to-hub connection arrangement is disclosed in co-pending application Ser. No. 14/640,152. In this approach, a brake disc is provided with a plurality of wedge-shaped slots about an inner circumference of the brake disc radially positioned in locations corresponding to brake disc mounting studs provided on an axle hub. The brake disc and the hub are connected to one another by wedge-shaped elements (aka "keys") that are positioned in corresponding transverse wedge-shaped holes in a radially inner region of the brake disc, preferably with a retaining device that retains the keys in their respective holes in the brake disc.

A common issue with many approaches to connecting a brake disc to an axle hub is the blockage of cooling air from the inner radial region of the brake disc toward the outer radial region, where the cooling air is drawn through interior channels located in the brake disc between parallel friction rings by differential pressure between the relatively stagnant air near the hub and the relatively low pressure at the outer circumference of the brake disc created by the Bernoulli effect at the outer circumference.

With or without significant cooling air flow blockage by axle hub-to-brake disc mounting arrangements, many internally-ventilated brake disc cooling channel and vane arrangements are known in the art. These include, for example, vanes that extend radially outward from the inner radius of the brake disc friction surfaces, vanes that extend in straight lines that are offset at an angle relative to radially-oriented vanes, vanes having a curved shape, and vanes having different lengths (e.g., vanes with alternating starting distances from the inner radius of the friction rings).

The present invention provides an improved approach to internally-ventilated brake disc cooling channel and vane arrangements which enhances cooling air flow, despite the presence of substantial hub-to-brake disc connecting structures.

In an embodiment of the present invention, the internally ventilated brake disc is provided with at least one circumferential row of flow-modifying features radially outboard of, and adjacent to, the brake disc's hub-mounting structure. These flow-modifying features further are radially separated from the primary internal cooling vanes and channels of the brake disc.

The inventor has determined that the inclusion of such a radially-inner row of flow-modifying features to be highly effective at re-directing cooling air flow into adjacent cooling channels. These features effectively increase the pressure of the cooling air entering the cooling channels as compared to the pressure at the radially inner ends of the channels of a brake disc without the flow-modifying features, which would otherwise see a Bernoulli-induced pressure decrease at the radially inner ends of the channels (a lesser pressure decrease than at the higher velocity radially outer ends of the channels).

As the brake disc rotates, cooling air flow entering the radially inner region of the brake disc first passes radially outward through the hub-to-brake disc mounting elements. Emerging from the mounting element region, the cooling air encounters at least a first circumferential row of flow-modifying features, for example, round or oval cross-section bars between the two parallel friction rings. Because these flow-modifying features are rotating about the hub rotation axis at a higher angular velocity than the incoming cooling air, the flow-modifying features change the direction, velocity and relative pressure of the cooling air. By sizing an locating the flow-modifying features to suit the particular application, these features may be arranged such that the deflected cooling air is directed toward a particular vane or into a particular cooling channel, thereby increasing the cooling air mass flow in the channel to increase the amount of heat transfer and removal from the brake disc.

The present invention is not limited to a particular vane structure such as only straight cooling vanes and channels or only curved cooling vanes or channels. Rather, the present invention is directed to the inclusion of flow-modifying features immediately radially outside a brake disc's hub connection region that are tailored to re-direct the incoming cooling air flow in a more focused manner into the cooling channels. Further, the present invention is not limited to re-directing cooling air flow in a solely-radially outward direction, but instead uses the difference in angular velocity of a flow-modifying feature and the incoming cooling air flow to re-direct the cooling air flow into one or more cooling channels that are circumferentially displaced behind the flow-modifying feature.

The present invention is also not limited to flow-modifying features radially aligned with adjacent cooling channel vanes, but may include flow-modifying features that are circumferentially displaced relative to the vanes and/or omission of one or more flow modifying features, i.e., inclusion of fewer flow-modifying features than cooling vanes. Similarly, more than one circumferential row of in-line or staggered flow-modifying features may be included in a particular application where the additional row(s) help further focus the cooling air flow into the radially outer cooling channels.

Other objects, advantages and novel features of the present invention will become apparent from the following detailed description of the invention when considered in conjunction with the accompanying drawings.

DETAILED DESCRIPTION OF THE DRAWINGS

Figure 1:
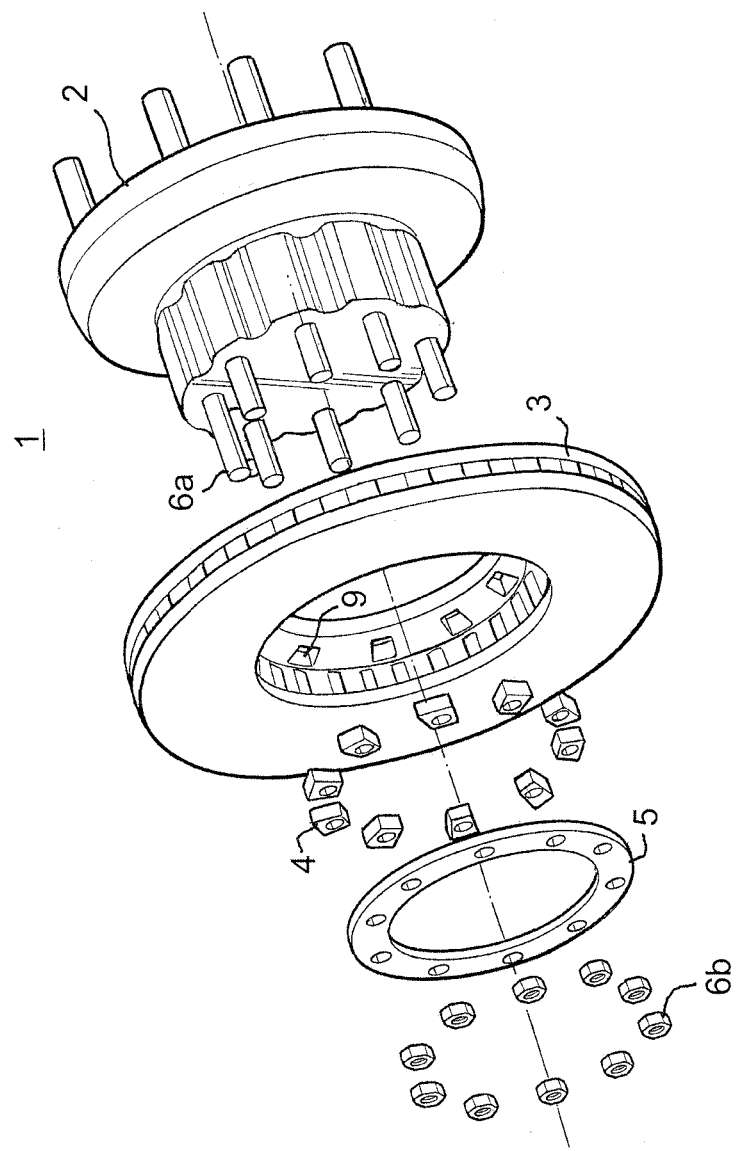
FIG. 1 is an oblique expanded view of a brake disc mounting arrangement for an internally ventilated brake disc.

FIG. 1 illustrates an example brake disc mounting arrangement 1 from co-pending application Ser. No. 14/640,152 which includes a rotating axle hub 2 located on an end of a vehicle axle (not illustrated), a brake disc 3, wedge-shaped keys 4 which are configured to be located within wedge-shaped holes 9 in the brake disc 3, a retaining ring 5 and studs 6a and corresponding retaining members, nuts 6b.

Figure 2:
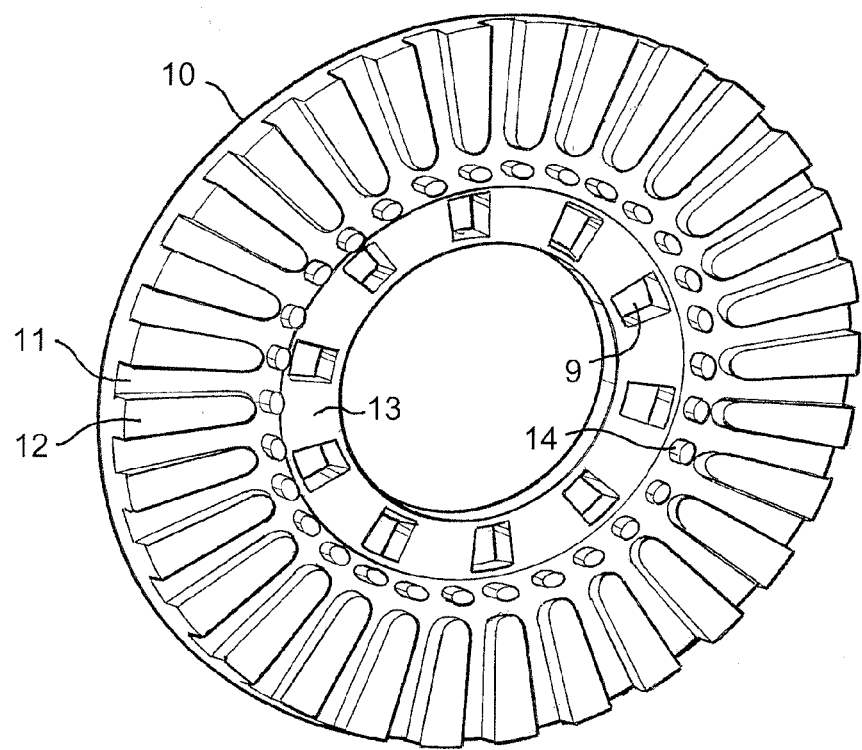
FIG. 2 is an elevation view of a cross-section of a brake disc in accordance with the present invention.

FIG. 2 shows an elevation cross-section of a brake disc 10 in accordance with an embodiment of the present invention. The brake disc 10 includes a plurality of internal ventilation cooling channels 11 formed between adjacent cooling channel vanes 12. In this embodiment the vanes 12 are essentially straight and radially aligned with radii having their origin at the rotation axis of the brake disc, and in particular are wedge-shaped and have rounded radially inner tips to aid in cooling air entry into the channels. Preferably, the cooling channel inlet area is approximately 25% smaller than the area at the cooling change outlet to enhance flow velocity, both within the channel and in the vicinity of the adjacent flow modifying feature. As noted above, the present invention is not limited to such cooling channel and vane shapes.

Between the radially-inner ends of the cooling channels 11 and cooling vanes 12 and the radially inner region 13 of the brake disc containing the hub-to-disc mounting features is a circumferential row of a plurality of flow-modifying features 14. In this embodiment the flow-modifying features are circumferentially aligned with corresponding cooling vanes, but in other embodiments may be circumferentially offset or include multiple rows of such features. FIG. 2 also shows the flow-modifying features 14 to be elliptically-shaped, but other shapes that provide suitable cooling air flow deflection may be employed. The radial distance between the flow modifying features and the radially inner ends of the cooling channels may be determined as a function of the cross-sectional shape of the features. For example, in the case of the elliptical shape in this embodiment the separation distance is on the order of 1.5 times the radial height of the ellipse, i.e., the length of the minor axis of the ellipse. In the case of a circular cross-section, the preferred ratio of separation distance to feature radial thickness may be on the order of 1:1.

One of ordinary skill may determine the optimal feature thickness-to-separation distance ratio for a given feature geometry by optimizing calculations, for example, by employing software flow dynamics calculation software available from Ansys, Inc. of Canonsburg, Pa. to solve Reynolds averaged Navier-Stokes $2^{nd}$-order non-linear partial differential equations. The circumferential vane separation distance may likewise be optimized by calculation. Preferably the distance between vanes is approximately the same as the widths of the vanes themselves. Further preferably, the number of flow modifying features is the same as the number of vanes.

The number and thickness of the vanes may be determined as a function of the desired thermal mass of the rotor. For example, where a rotor with 30 vanes may have a thermal mass of 33 kg., if the desired thermal mass is only 24 kg, the number vanes may be reduced accordingly to 24 vanes.

Figure 3:
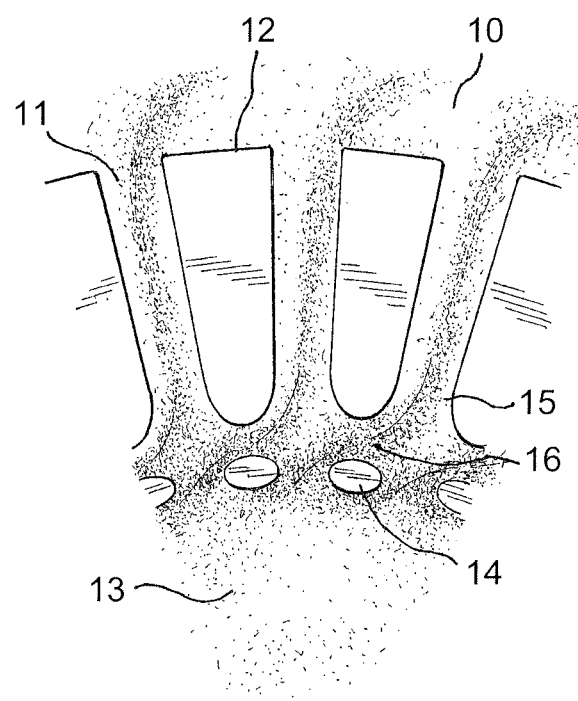
FIG. 3 is an enlarged partial view of the FIG. 2 cross-section showing modified cooling air flow to enhance entry of cooling air into the cooling channels.

FIG. 3 is an enlarged partial section of the FIG. 2 brake disc cross-section showing an example of the enhanced cooling air flow obtainable with the inclusion of the flow-modifying features of the present invention. In this partial section, the portion of the radially inner region 13 shown is located between adjacent holes 9. As shown by the cooling air flow velocity profiles in this figure, as the brake disc rotates from right to left in this figure, the cooling air flow entering the radially inner region 13 is deflected by the oval-shaped flow-modifying features 14, which have a higher angular velocity than the cooling air, thereby focusing the cooling air flow toward the entrances 15 of the cooling channels. In the FIG. 3 embodiment, the highlighted flow-modifying feature 14 causes the cooling air 16 passing this feature to be directed toward the cooling channel 15 that is behind the flow-modifying feature 14 relative to the disc rotation direction. The cooling air flow need not be focused into a single cooling channel, nor does the deflected cooling air have to flow only into a circumferentially-later cooling channel, as long as the flow-modifying features increase the cooling air pressure and mass flow at the entrances of the cooling channels.

The present invention is flexible enough to be adapted to a variety of internally ventilated brake disc cooling channel and vane arrangements, and one of ordinary skill in the art will understand how to adjust the size, cross-sectional shape, location (both circumferentially and radially relative to the vanes and the radially inner region) of the flow-modifying features to suit a particular brake disc application to provide the increased cooling air pressure and mass flow at the entrances of the cooling channels.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LISTING OF REFERENCE LABELS 1 brake disc mounting arrangement
2 axle hub
3 brake disc
4 wedge-shaped key element
5 retaining ring
6a fastener stud
6b fastener nut
9 wedge-shaped holes
10 brake disc
11 cooling channel
12 cooling channel vane
13 radially inner region
14 flow-modifying features
15 cooling channel entrances
16 cooling air flow

What is claimed is:

1. An internally ventilated brake disc, comprising:
a plurality of friction rings;
a radially inner region connected to at least one of the plurality of friction rings;
a plurality of cooling vanes forming cooling channels between adjacent vanes, the plurality of cooling vanes being located between the plurality of friction rings and arranged to guide cooling air from the radially inner region to a region radially outward from the brake disc; and
a plurality of flow-modifying features located between the radially inner region and the plurality of cooling vanes, the plurality of flow-modifying features having a radial length less than a radial length of the plurality of cooling vanes and an elliptical cross-section with a minor axis aligned in a radial direction,
wherein
the radially inner region includes mounting features configured for use in mounting the brake disc on an axle hub,
the plurality of flow-modifying features are radially separated from the plurality of cooling vanes, and
the plurality of flow-modifying features are radially aligned with a radially inner end of an adjacent one of the plurality of cooling vanes at a separation distance selected such that the plurality of flow-modifying features deflect cooling air entering the radially inner region toward an entrance of a respective one of the cooling channels behind the adjacent one of the plurality of cooling vanes in a brake disc rotation direction in a manner that increases an air pressure at the entrance of the respective one of the cooling channels behind the adjacent one of the plurality of cooling vanes relative to an air pressure which would be present at the entrance of the respective one of the cooling changes without the plurality of flow-modifying features.

2. The internally ventilated brake disc of claim 1, wherein the plurality of flow-modifying features are located in a single circumferential row.

3. A method of cooling an internally ventilated brake disc having a plurality of friction rings, a radially inner region connected to at least one of the plurality of friction rings, a plurality of cooling vanes forming cooling channels between adjacent vanes, the plurality of cooling vanes being located between the plurality of friction rings and arranged to guide cooling air from the radially inner region to a region radially outward from the brake disc, and a plurality of flow-modifying features located between the radially inner region and the plurality of cooling vanes, the plurality of flow-modifying features being radially aligned with a radially inner end of an adjacent one of the plurality of cooling vanes, having a radial length less than a radial length of the plurality of cooling vanes, and having an elliptical cross-section with a minor axis aligned in a radial direction, comprising the acts of:
rotating the brake disc;
drawing cooling air into the radially inner region of the brake disc radially inside of the plurality of flow-modifying features;
passing the drawn-in cooling air radially outward in a direction of the plurality of flow-modifying features;
deflecting at least a portion of the drawn-in cooling air with the plurality of flow-modifying features in a circumferential direction of the rotating brake disc and into a respective one of the cooling channels behind in a rotation direction the adjacent one of the plurality of cooling vanes; and
passing the deflected drawn-in cooling air radially outward through the cooling channels, wherein the plurality of cooling vanes and the plurality of flow-modifying features are at a separation distance selected such that in the deflecting act the drawn-in cooling air, at the entrance of the respective one of the cooling channels behind the adjacent one of the plurality of cooling vanes an air pressure is higher than an air pressure which would be present at the entrance of the respective one of the cooling changes without the plurality of flow-modifying features.

4. The method of cooling an internally ventilated brake disc of claim 3, wherein the plurality of flow-modifying features are sized and positioned to maximize the flow of the deflected drawn-in cooling air flow into the cooling channels.

* * * * *